United States Patent
Junio

(10) Patent No.: US 12,190,526 B2
(45) Date of Patent: Jan. 7, 2025

(54) COMPUTED TOMOGRAPHY TO FLUOROSCOPY REGISTRATION USING SEGMENTED INPUTS

(71) Applicant: Mazor Robotics Ltd., Caesarea (IL)

(72) Inventor: Dany Junio, Tel Aviv-Jaffa (IL)

(73) Assignee: Mazor Robotics Ltd., Caesarea (IL)

( * ) Notice: Subject to any disclaimer, the term of this patent is extended or adjusted under 35 U.S.C. 154(b) by 280 days.

(21) Appl. No.: 17/590,010

(22) Filed: Feb. 1, 2022

(65) Prior Publication Data
US 2022/0270263 A1 Aug. 25, 2022

Related U.S. Application Data

(60) Provisional application No. 63/152,656, filed on Feb. 23, 2021.

(51) Int. Cl.
*G06T 7/174* (2017.01)
*G06T 7/38* (2017.01)

(52) U.S. Cl.
CPC ............... *G06T 7/174* (2017.01); *G06T 7/38* (2017.01); *G06T 2207/10081* (2013.01); *G06T 2207/10088* (2013.01); *G06T 2207/10121* (2013.01); *G06T 2207/10136* (2013.01); *G06T 2207/30012* (2013.01)

(58) Field of Classification Search
CPC . G06T 7/174; G06T 7/38; G06T 2207/10121; G06T 2207/30012; G06T 2207/10136; G06T 2207/10081; G06T 2207/10088
See application file for complete search history.

(56) References Cited

U.S. PATENT DOCUMENTS

| | | |
|---|---|---|
| 9,687,204 B2 | 6/2017 | Mountney et al. |
| 10,152,796 B2 | 12/2018 | Guo et al. |
| 2009/0080737 A1 | 3/2009 | Battle et al. |
| 2017/0020630 A1 | 1/2017 | Johnson et al. |
| 2020/0334820 A1 | 10/2020 | Radich |

OTHER PUBLICATIONS

Booth et al. "Image Segmentation Using MRI Vertebral Cross-Sections," Canadian Conference on Electrical and Computer Engineering, 2001, vol. 2, pp. 1303-1307.
Wu "2D-3D Registration of Knee Joint from Single Plane X-ray Fluoroscopy Using Nonlinear Shape Priors," University of Tennessee, Knoxville, Doctoral Dissertation, May 2016, 143 pages [retrieved online from: https://trace.tennessee.edu/cgi/viewcontent.cgi?referer=&httpsredir=1&article=5037&context=utk_graddiss].
International Search Report and Written Opinion for International (PCT) Patent Application No. PCT/IL2022/050197, dated Jun. 1, 2022, 18 pages.

*Primary Examiner* — Tuan H Nguyen
(74) *Attorney, Agent, or Firm* — Sheridan Ross P.C.

(57) ABSTRACT

A method according to embodiments of the present disclosure includes receiving a computed tomography (CT) image of a patient; segmenting a first set of anatomical elements from the CT image; receiving a plurality of fluoroscopy images of the patient; segmenting a second set of anatomical elements from the plurality of fluoroscopy images; and creating a registration between the CT image and the plurality of fluoroscopy images based on the segmented first set of anatomical elements and the segmented second set of anatomical elements.

22 Claims, 4 Drawing Sheets

COMPUTED TOMOGRAPHY TO FLUOROSCOPY REGISTRATION USING SEGMENTED INPUTS

CROSS REFERENCE TO RELATED APPLICATIONS

This application claims priority to and the benefit of U.S. Provisional Application No. 63/152,656, filed on Feb. 23, 2021, entitled "Computer Tomography to Fluoroscopy Registration Using Segmented Inputs". The entire disclosure of the application listed above is hereby incorporated herein by reference, in its entirety, for all that it teaches and for all purposes.

FIELD

The present technology generally relates to medical imaging, and relates more particularly to registration of medical images.

BACKGROUND

Image guidance may be used in manual, robot-assisted, and/or fully autonomous surgeries. At least some image guidance techniques require registration of a preoperative image (which may have been used to plan a surgery) with one or more intraoperative images (which may be used, for example, to determine where a patient is within a navigation coordinate space or other relevant reference system). Correlating the preoperative image with the one or more intraoperative images through registration enables a precise anatomical location specified in one image (e.g., the preoperative image) to be identified in another image (e.g., one of the one or more intraoperative images).

SUMMARY

Example aspects of the present disclosure include:

A method according to at least one embodiment of the present disclosure comprises receiving a computed tomography (CT) image of a patient; segmenting a first set of anatomical elements from the CT image; receiving a plurality of fluoroscopy images of the patient; segmenting a second set of anatomical elements from the plurality of fluoroscopy images; and creating a registration between the CT image and the plurality of fluoroscopy images based on the segmented first set of anatomical elements and the segmented second set of anatomical elements.

Any of the aspects herein, wherein the segmenting the second set of anatomical elements further comprises determining that a first anatomical element overlaps a second anatomical element.

Any of the aspects herein, wherein the first anatomical element is a vertebra and the second anatomical element is a rib.

Any of the aspects herein, wherein the determining comprises detecting a gradient line within a boundary of the second anatomical element in at least one of the plurality of fluoroscopy images.

Any of the aspects herein, further comprising subtracting pixels corresponding to the first anatomical element from at least one of the plurality of fluoroscopy images.

Any of the aspects herein, wherein the subtracting is based on information about an expected shape of at least one of the first anatomical element or the second anatomical element.

Any of the aspects herein, wherein creating the registration comprises matching at least one first gradient corresponding to at least one anatomical element of the first set of anatomical elements with at least one second gradient corresponding to at least one anatomical element of the second set of anatomical elements.

Any of the aspects herein, further comprising removing one or more gradient lines from at least one of the plurality of fluoroscopy images.

Any of the aspects herein, wherein the first set of anatomical elements comprises at least one of a patella or a soft tissue anatomical element.

A system according to at least one embodiment of the present disclosure comprises a processor; and a memory storing instructions that, when executed by the processor, cause the processor to: receive a three-dimensional (3D) image of a patient's anatomy; segment a first set of anatomical elements from the 3D image; cause an imaging device to capture one or more two-dimensional (2D) images of the patient's anatomy; segment a second set of anatomical elements from the one or more 2D images; clean the one or more 2D images by removing at least one gradient line from each 2D image of the one or more 2D images; and register the one or more cleaned 2D images to the 3D image based on the segmented first set of anatomical elements and the segmented second set of anatomical elements.

Any of the aspects herein, wherein the segmenting comprises determining that a first anatomical element overlaps a second anatomical element.

Any of the aspects herein, wherein the segmenting is based on information about an expected shape of at least one of the first anatomical element or the second anatomical element.

Any of the aspects herein, wherein the at least one gradient line is located in an anatomical element of the second set of anatomical elements.

Any of the aspects herein, wherein the segmenting of the segmented second set of anatomical elements further comprises defining a boundary around at least one anatomical tissue.

Any of the aspects herein, further comprising subtracting pixels corresponding to the at least one anatomical tissue from the segmented second set of anatomical features.

Any of the aspects herein, wherein the boundary defines an area indicating an overlap between the at least one anatomical tissue and an anatomical object of the segmented second set of anatomical elements.

Any of the aspects herein, wherein the segmenting further comprises identifying one or more gradient lines associated with each of the first set of anatomical elements.

Any of the aspects herein, wherein the 3D image and the one or more 2D images omit the use of fiducials.

A system according to at least one embodiment of the present disclosure comprises a processor; an imaging device; and a memory storing instructions thereon that, when executed by the processor, cause the processor to: receive a three-dimensional (3D) image; cause the imaging device to capture one or more two-dimensional (2D) images; segment a first set of anatomical elements from the 3D image; segment a second set of anatomical elements from each of the one or more 2D images, the segmenting including defining a boundary of a first anatomical object; remove the first anatomical object from at least one of the one or more 2D images to yield one or more cleaned 2D images; register the one or more cleaned 2D images to the 3D image based on the segmented first set of anatomical elements and the segmented second set of anatomical elements.

Any of the aspects herein, wherein the removing the first anatomical object further comprises subtracting pixels corresponding to the first anatomical object from the at least one of the one or more 2D images.

Any of the aspects herein, wherein the 3D image is a CT scan, an MM scan, or an ultrasound.

Any of the aspects herein, wherein the one or more 2D images is a fluoroscopy image, an MRI image, or an ultrasound image.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
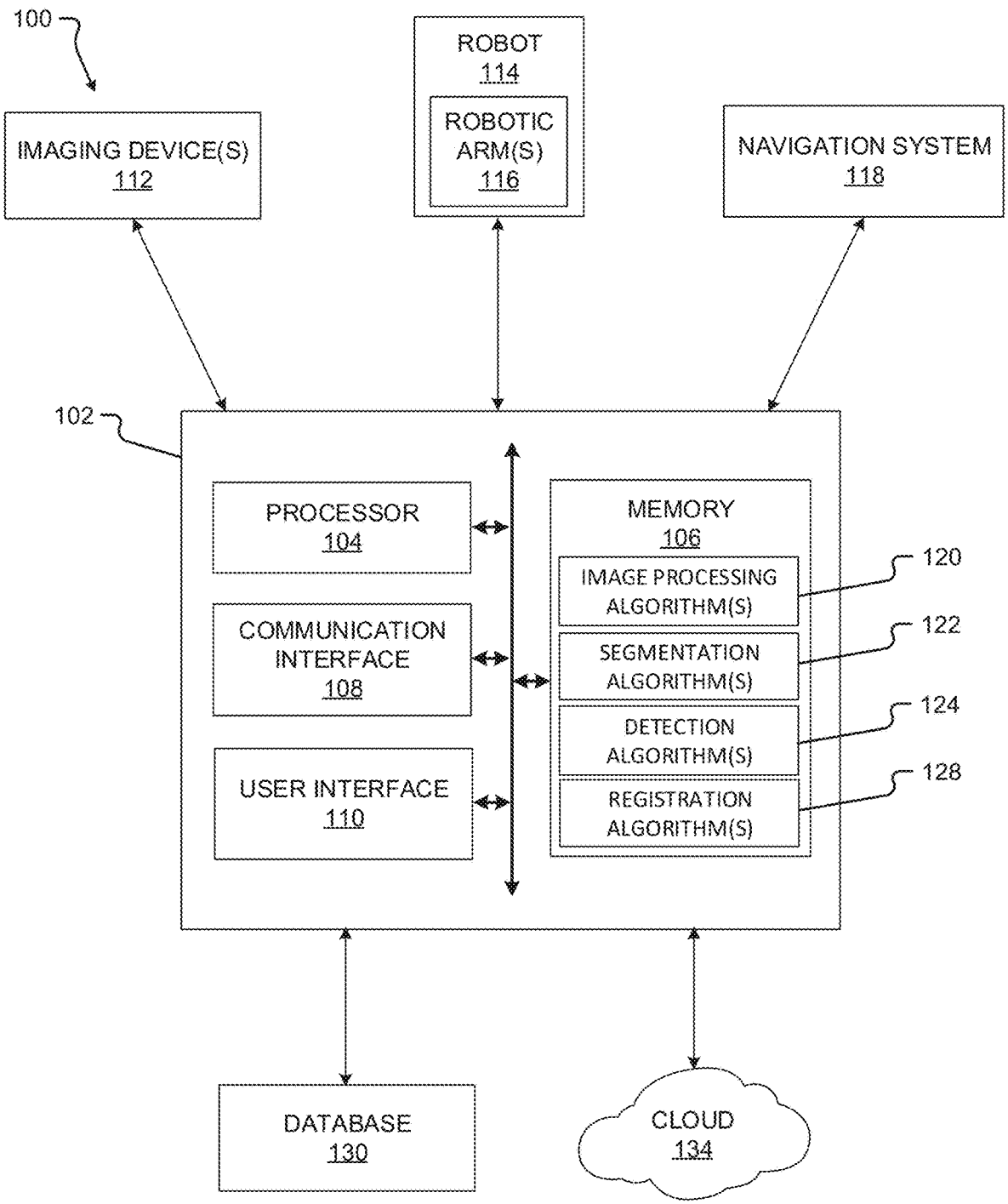
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

For registration, images such as Computed Tomography (CT) and intraoperative fluoroscopy images may be noisy and may depict or reflect multiple stacked anatomical elements along a line between an X-ray source and detector used to capture the images. In other words, when an image of a patient's spine is needed, a fluoroscopy image of the spine may also depict some or all of the patient's rib cage and/or any other anatomical elements that are positioned along a line between the X-ray source and detector, such that one or more aspects of the patient's spine may be obscured or less clear in the image. This is particularly the case when taking images of individuals with high Body Mass Index (BMI) or when taking images of a complex anatomy. The noise and the stacked view in the image may increase the difficulty of image registration (as it may be difficult to precisely identify matching gradients or other features across multiple images), and may create additional time costs, frustrate users, and/or lead to postponed or cancelled surgeries.

Figure 4:
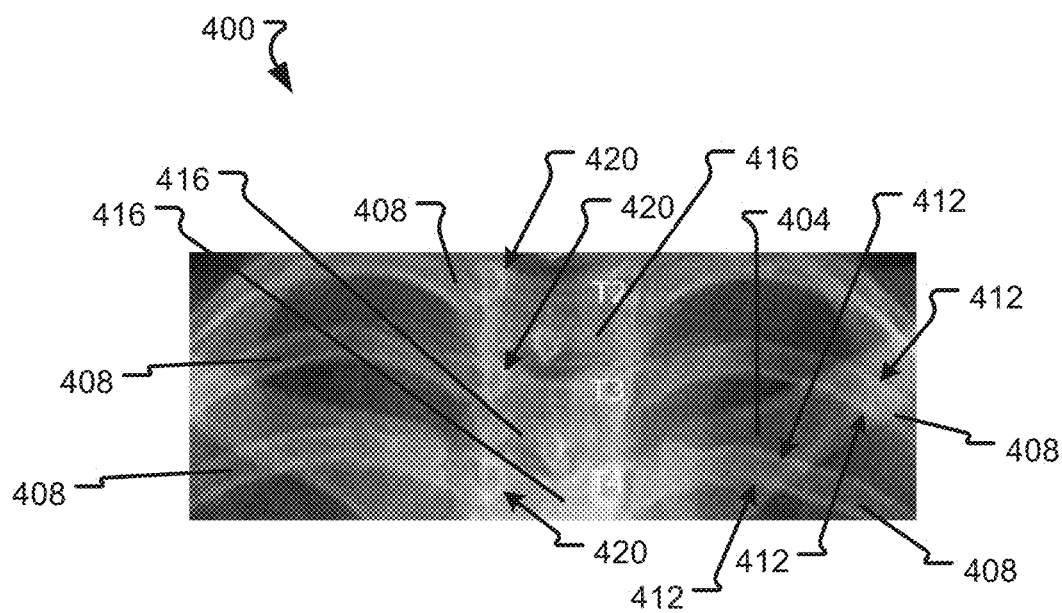
FIG. 4 is a first image of a 2D fluoroscopy image according to at least one embodiment of the present disclosure.
Figure 5:
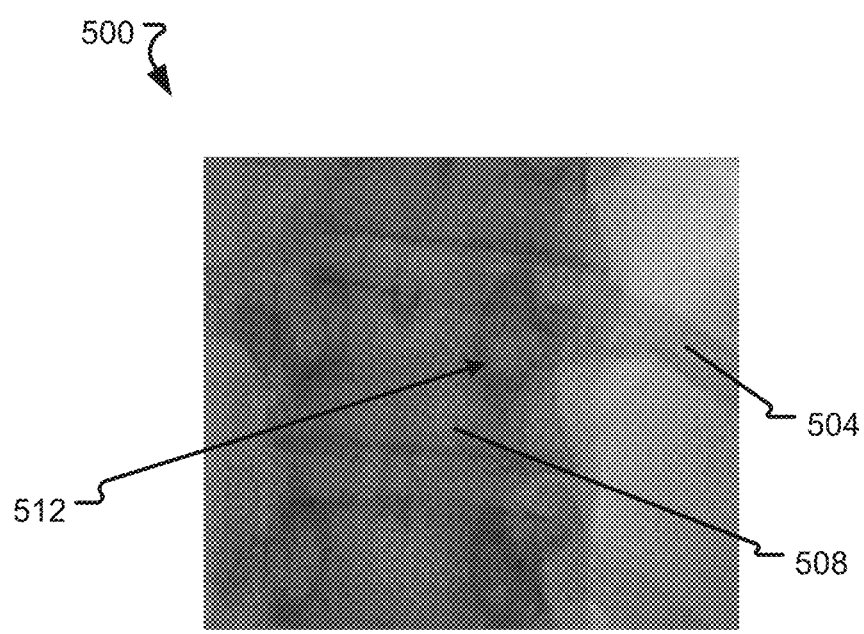
FIG. 5 is a second image of a 2D fluoroscopy image according to at least one embodiment of the present disclosure.

FIGS. 4-5 depict example 2D fluoroscopy images depicting overlapping anatomy of a patient, such as may be obtained intraoperatively in preparation for a registration process. In FIG. 4, a rib 408 overlaps a bone 404, resulting in a gradient 412 within the boundary of the bone 404 that does not correspond to the bone 404. Similarly, each rib 408 in the image overlaps with a vertebra 416 in the image, creating a gradient 420 located within an outer boundary of the corresponding vertebra 416. When performing registration using, for example, a gradient-matching technique to align vertebrae in the fluoroscopy image 400 with vertebrae in a preoperative CT scan or other image, the gradients 412 and/or the gradients 420 may increase the time required to complete the registration (by increasing the number of gradients in the image that must be analyzed and considered for a possible match) while reducing registration accuracy (if, for example, a gradient 412 and/or a gradient 420 is mistakenly identified as corresponding to an edge of a vertebra 416). To address these issues and improve the registration process and results, the gradients 412 and/or the gradients 420 may be removed using one or more of the methods (and/or one or more aspects thereof) described herein (e.g., a method 200 and/or a method 300).

FIG. 5 depicts another 2D fluoroscopy image 500 showing overlap between a rib 504 and a vertebra 508 in accordance with at least one embodiment of the present disclosure. The overlap between the rib 504 and the vertebra 508 in the image 500 creates a gradient 512 that falls within an outer boundary of the vertebra 508. As explained above, the appearance of the gradient 512 can negatively affect the registration process, particularly where the registration process uses a gradient-matching technique to align corresponding vertebra in the 2D fluoroscopy image and a preoperative CT scan or other image. One or more methods (and/or one or more aspects thereof) disclosed herein may be used to remove or lessen the appearance of the gradient 512 in the image 500, thus enabling improved registration.

Embodiments of the present disclosure permit a surgeon to better confirm a registration, improve initial guesses for registration, reduce the number of registration iterations sufficient to complete a surgery or surgical task, and reduce the amount of time needed for and frustration caused by the registration process.

According to at least some embodiments of the present disclosure, one or more vertebrae are segmented in each of a CT scan and one or more fluoroscopy images. Portions of patient anatomy that overlap the vertebrae (e.g., ribs) in the images may also be segmented. The portions may then be removed from the images (yielding, for example, cleaned images), and a registration between the vertebrae in the CT image and the vertebrae in the fluoroscopy images may be made (using the cleaned images). A surgeon may then approve or reject the segmented version of the registration.

Embodiments of the present disclosure provide technical solutions to one or more of the problems of cleaning noisy intraoperative surgical images; improving registration accuracy for autonomous, semi-autonomous, and/or other image-guided surgeries or surgical procedures; reducing the time needed to complete registration in the operating room (and thus conserving operating room resources); reducing registration failure rate; and/or improving a surgeon visibility into the registration process.

Turning to FIG. 1, a block diagram of a system 100 according to at least one embodiment of the present disclosure is shown. The system 100 may be used to facilitate registration for a surgery or surgical procedure; to clean one or more images (e.g., remove noise or image artifacts in the one or more images); and/or carry out one or more other aspects of one or more of the methods disclosed herein. The system 100 comprises a computing device 102, one or more imaging devices 112, a robot 114, a navigation system 118, a database 130, and/or a cloud or other network 134. Systems according to other embodiments of the present disclosure may comprise more or fewer components than the system 100. For example, the system 100 may not include the imaging device 112, the robot 114, the navigation system 118, one or more components of the computing device 102, the database 130, and/or the cloud 134.

The computing device 102 comprises a processor 104, a memory 106, a communication interface 108, and a user interface 110. Computing devices according to other embodiments of the present disclosure may comprise more or fewer components than the computing device 102.

The processor 104 of the computing device 102 may be any processor described herein or any similar processor. The processor 104 may be configured to execute instructions stored in the memory 106, which instructions may cause the processor 104 to carry out one or more computing steps utilizing or based on data received from the imaging device 112, the robot 114, the navigation system 118, the database 130, and/or the cloud 134.

The memory 106 may be or comprise RAM, DRAM, SDRAM, other solid-state memory, any memory described herein, or any other tangible, non-transitory memory for storing computer-readable data and/or instructions. The memory 106 may store information or data useful for completing, for example, any step of the methods 200 and/or 300 described herein, or of any other methods. The memory 106 may store, for example, one or more image processing algorithms 120, one or more segmentation algorithms 122, one or more detection algorithms 124, and/or one or more registration algorithms 128. Such instructions or algorithms may, in some embodiments, be organized into one or more applications, modules, packages, layers, or engines. The algorithms and/or instructions may cause the processor 104 to manipulate data stored in the memory 106 and/or received from or via the imaging device 112, the robot 114, the database 130, and/or the cloud 134.

The computing device 102 may also comprise a communication interface 108. The communication interface 108 may be used for receiving image data or other information from an external source (such as the imaging device 112, the robot 114, the navigation system 118, the database 130, the cloud 134, and/or any other system or component not part of the system 100), and/or for transmitting instructions, images, or other information to an external system or device (e.g., another computing device 102, the imaging device 112, the robot 114, the navigation system 118, the database 130, the cloud 134, and/or any other system or component not part of the system 100). The communication interface 108 may comprise one or more wired interfaces (e.g., a USB port, an ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The computing device 102 may also comprise one or more user interfaces 110. The user interface 110 may be or comprise a keyboard, mouse, trackball, monitor, television, screen, touchscreen, and/or any other device for receiving information from a user and/or for providing information to a user. The user interface 110 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 110 may be useful to allow a surgeon or other user to modify instructions to be executed by the processor 104 according to one or more embodiments of the present disclosure, and/or to modify or adjust a setting of other information displayed on the user interface 110 or corresponding thereto.

Although the user interface 110 is shown as part of the computing device 102, in some embodiments, the computing device 102 may utilize a user interface 110 that is housed separately from one or more remaining components of the computing device 102. In some embodiments, the user interface 110 may be located proximate one or more other components of the computing device 102, while in other embodiments, the user interface 110 may be located remotely from one or more other components of the computing device 102.

The imaging device 112 may be operable to image anatomical feature(s) (e.g., a bone, veins, tissue, etc.) and/or other aspects of patient anatomy to yield image data (e.g., image data depicting or corresponding to a bone, veins, tissue, etc.). "Image data" as used herein refers to the data generated or captured by an imaging device 112, including in a machine-readable form, a graphical/visual form, and in any other form. In various examples, the image data may comprise data corresponding to an anatomical feature of a patient, or to a portion thereof. The image data may be or comprise a preoperative image, an intraoperative image, a postoperative image, or an image taken independently of any surgical procedure. In some embodiments, a first imaging device 112 may be used to obtain first image data (e.g., a first image) at a first time, and a second imaging device 112 may be used to obtain second image data (e.g., a second image) at a second time after the first time. The imaging device 112 may be capable of taking a 2D image or a 3D image to yield the image data. The imaging device 112 may be or comprise, for example, an ultrasound scanner (which may comprise, for example, a physically separate transducer and receiver, or a single ultrasound transceiver); an O-arm, a C-arm, a G-arm, or any other device utilizing X-ray-based imaging (e.g., a fluoroscope, a CT scanner, or other X-ray machine), any of which may also comprise a physically separate emitter and detector; a magnetic resonance imaging (MRI) scanner; an optical coherence tomography (OCT) scanner; an endoscope; a microscope; an optical camera; a thermographic camera (e.g., an infrared camera); a radar system (which may comprise, for example, a transmitter, a receiver, a processor, and one or more antennae); or any other imaging device 112 suitable for obtaining images of an anatomical feature of a patient. The imaging device 112 may be contained entirely within a single housing, or may comprise a transmitter/emitter and a receiver/detector that are in separate housings or are otherwise physically separated.

In some embodiments, the imaging device 112 may comprise more than one imaging device 112. For example, a first imaging device may provide first image data and/or a first image, and a second imaging device may provide second image data and/or a second image. In still other embodiments, the same imaging device may be used to provide both the first image data and the second image data, and/or any other image data described herein. The imaging device 112 may be operable to generate a stream of image data. For example, the imaging device 112 may be configured to operate with an open shutter, or with a shutter that continuously alternates between open and shut so as to capture successive images. For purposes of the present disclosure, unless specified otherwise, image data may be considered to be continuous and/or provided as an image data stream if the image data represents two or more frames per second.

The robot 114 may be any surgical robot or surgical robotic system. The robot 114 may be or comprise, for example, the Mazor X™ Stealth Edition robotic guidance system. The robot 114 may be configured to position the imaging device 112 at one or more precise position(s) and orientation(s), and/or to return the imaging device 112 to the same position(s) and orientation(s) at a later point in time. The robot 114 may additionally or alternatively be configured to manipulate a surgical tool (whether based on guidance from the navigation system 118 or not) to accomplish or to assist with a surgical task. In some embodiments, the robot 114 may be configured to hold and/or manipulate an anatomical element during or in connection with a surgical procedure. The robot 114 may comprise one or more robotic arms 116. In some embodiments, the robotic arm 116 may comprise a first robotic arm and a second robotic arm, though the robot 114 may comprise more than two robotic arms. In some embodiments, one or more of the robotic arms 116 may be used to hold and/or maneuver the imaging device 112. In embodiments where the imaging device 112 comprises two or more physically separate components (e.g., a transmitter and receiver), one robotic arm 116 may hold one such component, and another robotic arm 116 may hold another such component. Each robotic arm 116 may be positionable independently of the other robotic arm. The robotic arms may be controlled in a single, shared coordinate space, or in separate coordinate spaces.

The robot 114, together with the robotic arm 116, may have, for example, one, two, three, four, five, six, seven, or more degrees of freedom. Further, the robotic arm 116 may be positioned or positionable in any pose, plane, and/or focal point. The pose includes a position and an orientation. As a result, an imaging device 112, surgical tool, or other object held by the robot 114 (or, more specifically, by the robotic arm 116) may be precisely positionable in one or more needed and specific positions and orientations.

The robotic arm(s) 116 may comprise one or more sensors that enable the processor 104 (or a processor of the robot 114) to determine a precise pose in space of the robotic arm (as well as any object or element held by or secured to the robotic arm).

In some embodiments, reference markers (i.e., navigation markers) may be placed on the robot 114 (including, e.g., on the robotic arm 116), the imaging device 112, or any other object in the surgical space. The reference markers may be tracked by the navigation system 118, and the results of the tracking may be used by the robot 114 and/or by an operator of the system 100 or any component thereof. In some embodiments, the navigation system 118 can be used to track other components of the system (e.g., imaging device 112) and the system can operate without the use of the robot 114 (e.g., with the surgeon manually manipulating the imaging device 112 and/or one or more surgical tools, based on information and/or instructions generated by the navigation system 118, for example).

The navigation system 118 may provide navigation for a surgeon and/or a surgical robot during an operation. The navigation system 118 may be any now-known or future-developed navigation system, including, for example, the Medtronic StealthStation™ S8 surgical navigation system or any successor thereof. The navigation system 118 may include one or more cameras or other sensor(s) for tracking one or more reference markers, navigated trackers, or other objects within the operating room or other room in which some or all of the system 100 is located. The one or more cameras may be optical cameras, infrared cameras, or other cameras. In some embodiments, the navigation system may comprise one or more electromagnetic sensors. In various embodiments, the navigation system 118 may be used to track a position and orientation (i.e., pose) of the imaging device 112, the robot 114 and/or robotic arm 116, and/or one or more surgical tools (or, more particularly, to track a pose of a navigated tracker attached, directly or indirectly, in fixed relation to the one or more of the foregoing). The navigation system 118 may include a display for displaying one or more images from an external source (e.g., the computing device 102, imaging device 112, or other source) or for displaying an image and/or video stream from the one or more cameras or other sensors of the navigation system 118. In some embodiments, the system 100 can operate without the use of the navigation system 118. The navigation system 118 may be configured to provide guidance to a surgeon or other user of the system 100 or a component thereof, to the robot 114, or to any other element of the system 100 regarding, for example, a pose of one or more anatomical elements, whether or not a tool is in the proper trajectory, and/or how to move a tool into the proper trajectory to carry out a surgical task according to a preoperative or other surgical plan.

The system 100 or similar systems may be used, for example, to carry out one or more aspects of any of the methods 200 and/or 300 described herein. The system 100 or similar systems may also be used for other purposes.

Figure 2:
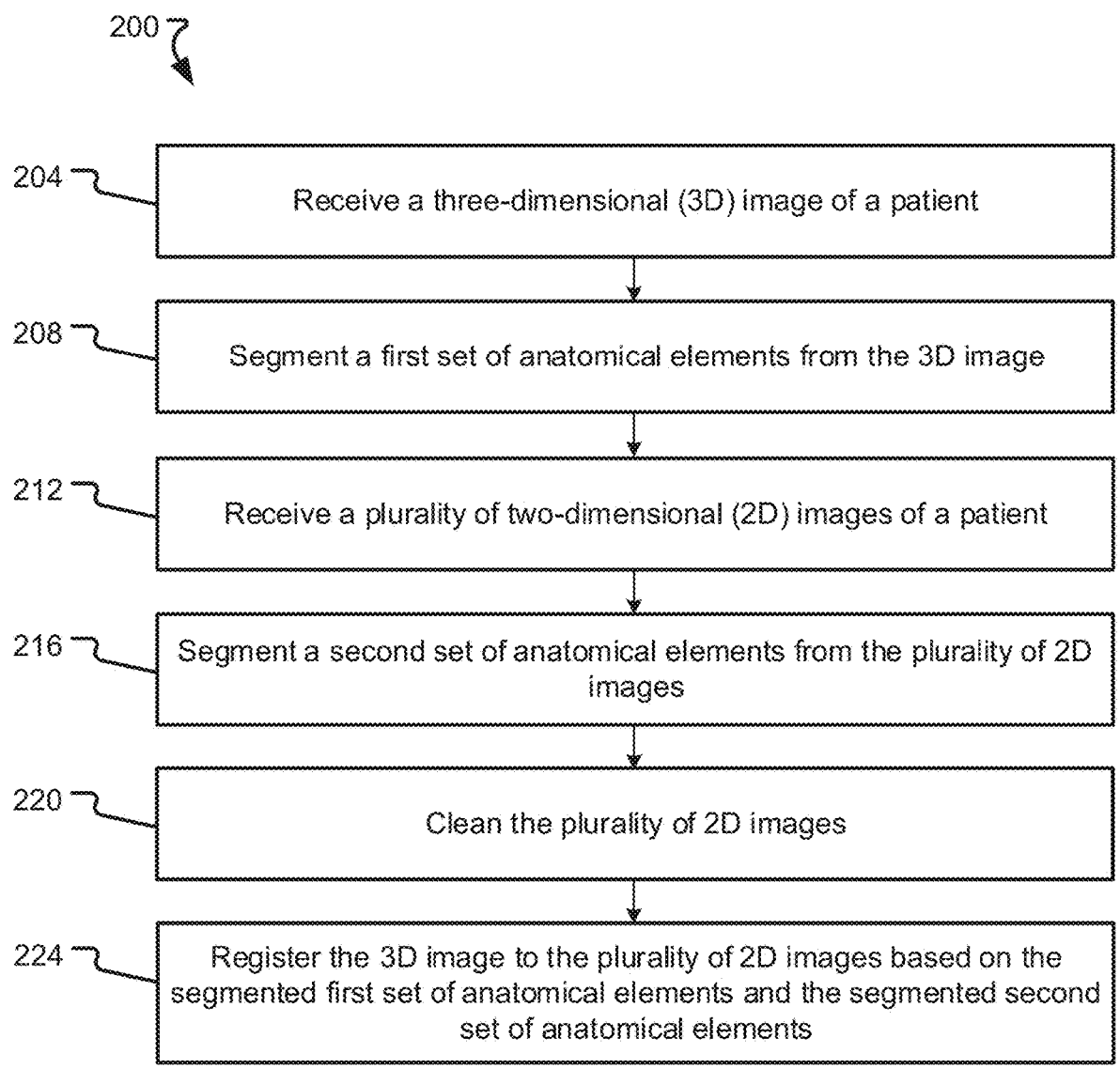
FIG. 2 is a flowchart according to at least one embodiment of the present disclosure.

FIG. 2 depicts a method 200 that may be used, for example, to register a three-dimensional image (e.g., a CT scan, an MRI scan, or any other 3D image) to a plurality of two-dimensional images (e.g., a plurality of fluoroscopy scans or other X-ray based images, a plurality of ultrasound images, or a plurality of 2D images generated using another imaging modality) after the two-dimensional images having been cleaned by removing superfluous artifacts or non-essential anatomical elements displayed in each of the plurality of two-dimensional images. The cleaning of the two-dimensional images may beneficially enable faster and/or more accurate registration, for example by reducing error associated with mismatched anatomical elements during registration and reducing the number of possible incorrect initial guesses provided to or otherwise used in, for example, a registration algorithm. As described in more detail below, the method 200 provides for removing noise and incidental anatomical elements from the plurality of two-dimensional images using, for example, gradient matching, pixel subtraction, overlap measurements, combinations thereof, and/or the like. Notwithstanding the foregoing, additional or alternative image filtering and processing techniques may be implemented in connection with the method 200 (or any other method discussed herein) to facilitate cleaning of the plurality of two-dimensional images.

The method 200 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 200. The at least one processor may perform the method 200 by executing instructions stored in a memory such as the memory 106. The instructions may correspond to one or more steps of the method 200 described below. The instructions may cause the processor to execute one or more algorithms, such as an image processing algorithm 120, a segmentation algorithm 122, a detection algorithm 124, and/or a registration algorithm 128.

The method 200 comprises receiving a three-dimensional (3D) image of a patient (step 204). The 3D image may be received via a user interface such as the user interface 110 and/or a communication interface such as the communication interface 108 of a computing device such as the computing device 102, and may be stored in a memory such as the memory 106 of the computing device. The 3D image may also be received from an external database or image repository (e.g., a hospital image storage system, such as a picture archiving and communication system (PACS), a health information system (HIS), and/or another system for collecting, storing, managing, and/or transmitting electronic medical records including image data), and/or via the Internet or another network. In other embodiments, the 3D image may be received or obtained from an imaging device such as the imaging device 112, which may be any imaging device such as an MRI scanner, a CT scanner, any other X-ray based imaging device, or an ultrasound imaging device. The 3D image may also be generated by and/or uploaded to any other component of a system such as the system 100. In some embodiments, the 3D image may be indirectly received via any other component of the system or a node of a network to which the system is connected.

The 3D image may depict a 3D pose (e.g., position and orientation) of a patient's anatomy or portion thereof. In some embodiments, the 3D image may be captured preoperatively (e.g., before surgery) and may be stored in a system (e.g., a system 100) and/or one or more components thereof (e.g., a database 130). The stored 3D image may then be received (e.g., by a processor 104), as described above, preoperatively (e.g., before the surgery) and/or intraoperatively (e.g., during surgery). In some embodiments, the 3D image may depict multiple anatomical elements associated with the patient anatomy, including incidental anatomical elements (e.g., ribs or other anatomical objects on which a surgery or surgical procedure will not be performed) in addition to target anatomical elements (e.g., vertebrae or other anatomical objects on which a surgery or surgical procedure is to be performed). The 3D image may comprise various features corresponding to the patient's anatomy and/or anatomical elements (and/or portions thereof), including gradients corresponding to boundaries and/or contours of the various depicted anatomical elements, varying levels of intensity corresponding to varying surface textures of the various depicted anatomical elements, combinations thereof, and/or the like. The 3D image may depict any portion or part of patient anatomy and may include, but is in no way limited to, one or more vertebrae, ribs, lungs, soft tissues (e.g., skin, tendons, muscle fiber, etc.), a patella, a clavicle, a scapula, combinations thereof, and/or the like.

In at least one embodiment, the 3D image may depict one or more views of at least one vertebra (e.g., a lumbar vertebra). In this embodiment, a surgery or surgical procedure may be planned to be conducted by a system (e.g., a system 100), a surgeon, and/or a combination thereof on the at least one vertebra with, for example, a surgical tool operating autonomously or semi-autonomously to drill, cut, tap, ream, saw, or otherwise operate on the at least one vertebra. The 3D image may be a CT scan taken of the patient preoperatively (e.g., a day before a surgery, two days before a surgery, a week before a surgery, etc.) and may include a depiction of the at least one vertebra and at least one rib (and/or of any other anatomical elements in the vicinity of the at least one vertebra). Once received, the CT scan may be used by the system and/or components thereof (e.g., a computing device 102), as described below, to perform a registration between the CT scan and intraoperatively captured scans (e.g., scans captured during the surgery such as fluoroscopy scans) to enable image-based guidance (e.g., using a navigation system 118) to guide the surgical tool (which may be attached to a robot such as a robot 114 and/or a robotic arm 116) to perform, or to assist a surgeon in performing, a surgical procedure (e.g., drilling into a vertebra).

In some embodiments, the method 200 may alternatively receive a plurality of 2D images in the step 204, and may use those 2D images to generate a 3D model of the patient's anatomy (depicting, e.g., one or more anatomical elements within a depicted region of the patient's anatomy). In these embodiments, the 2D images may be captured preoperatively or intraoperatively (e.g., using an imaging device such as imaging device 112). The 2D images may be captured in a variety of formats (e.g., fluoroscopy, ultrasound, etc.) and may be used, for example and as described later, for registration.

The method 200 also comprises segmenting a first set of anatomical elements from the 3D image (step 208). The segmenting of the first set of anatomical elements may occur preoperatively and/or intraoperatively, and the result of the segmenting is identification of one or more discrete anatomical elements. In other words, the segmenting yields a set of one or more anatomical elements having known boundaries within the 3D image. As a result, for example, two adjacent vertebrae can be distinguished as separate vertebrae, rather than being treated as a single anatomical element. Additionally or alternatively, a portion of the 3D image corresponding to a rib may be identified as such, and a portion of the image corresponding to a vertebra can also be identified as such. The first set of anatomical elements may be a collection of anatomical elements depicted in the 3D image (e.g., ribs, vertebrae, soft tissues, organs, etc.) that may be grouped or otherwise labeled as a group by, for example, one or more algorithms described herein. The first set of anatomical elements may comprise only a single type of anatomical element (e.g., vertebrae), or a single category of anatomical elements (e.g., bony anatomy), or a variety of anatomical elements. In some embodiments, the first set of anatomical elements may comprise both target anatomical elements (for a spinal surgery, e.g., vertebrae) as well as incidental anatomical elements (for a spinal surgery, e.g., ribs). The segmenting may comprise identifying both the target anatomical elements as well as the incidental anatomical elements with different and/or unique identifiers (e.g., tags, labels, highlighting, etc.). For example, the target anatomical elements may be highlighted in a first color (e.g., when displayed on a user interface), while the incidental or extraneous anatomical elements may be highlighted in a second color different from the first color.

In some embodiments, the step 208 may include using a processor (e.g., a processor 104) and a segmentation algorithm (e.g., a segmentation algorithm 122) to segment the 3D image to obtain the first set of anatomical elements. In some embodiments, the segmentation algorithm may select, crop out, identify, or otherwise label the first set of anatomical elements such that the first set of anatomical elements is visually and/or graphically distinguishable from the remainder of the 3D image (e.g., the portions of the 3D image not included in the first set of anatomical elements). In some embodiments, the segmentation algorithm may be trained on, for example, simulated and/or historical data (e.g., data from previous surgeries or surgical procedures, data based on previous imaging of the patient) to receive the 3D image and segment the 3D image to obtain or output the first set of anatomical elements.

The method 200 also comprises receiving a plurality of two-dimensional (2D) images of a patient (step 212). The plurality of 2D images may be received from a system (e.g., a system 100) and/or components thereof (e.g., a database 130). In some embodiments, the plurality of 2D images may be captured intraoperatively (e.g., by an imaging device 112, which may or may not be connected to a robotic arm 116). The plurality of 2D images may depict various views of one or more portions of a patient's anatomy (e.g., a plurality of 2D images of various angles of a patient while the patient in a prone position). Similarly to the received 3D image, each of the plurality of 2D images may depict multiple anatomical features of the patient anatomy, including incidental anatomical features (e.g., ribs or other anatomical elements extraneous to a surgery or surgical task) as well as target anatomical features (e.g., vertebrae or other anatomical elements on which the surgery or surgical task is to be conducted). Unlike the 3D image, however, each of the plurality of 2D images may comprise one or more "stacked views," or views of overlapping anatomical elements, in which anatomical elements are represented in any given stacked view depends on which anatomical elements are in a line of sight of the imaging device (or in other words, for an X-ray imaging device, which elements are positioned along a line between an emitter and a detector).

In at least one embodiment, the plurality of 2D images may depict one or more views of at least one vertebra (e.g., a lumbar vertebra) or other target anatomical elements. In this embodiment, the planned surgery or surgical procedure to be conducted by a system (e.g., a system 100), a surgeon, and/or a combination thereof may focus on the at least one vertebra. The plan may call for a surgical tool connected to a robotic arm operating autonomously or semi-autonomously to position the surgical tool to drill, cut, tap, ream, saw, or otherwise operate on the at least one vertebra. The plurality of 2D images may be or comprise fluoroscopy images taken intraoperatively (e.g., while the patient is on an operating table), and may depict various views or angles of the at least one vertebra (e.g., at different angles by causing the imaging device to move and capture the fluoroscopy images at poses relative to the at least one vertebra).

In some embodiments, the step 212 comprises receiving only a single 2D image. In such embodiments, the step 212 and one or more aspects of the method 200 may be carried out (e.g., by a processor 104) utilizing the single 2D image instead of the plurality of 2D images. For example, the steps of the method 200, such as the segmenting and the registering discussed below, may be performed on or with the single 2D image instead of a plurality of 2D images.

The method 200 also comprises segmenting a second set of anatomical elements from the plurality of 2D images (step 216). The step 216 may be similar to or the same as the step 208 (e.g., using a processor 104 and a segmentation algorithm 122) to segment a second set of anatomical elements from each of the plurality of 2D images. For instance, the second set of anatomical elements may comprise target anatomical elements (for a spinal surgery, e.g., vertebrae) as well as incidental anatomical elements (for a spinal surgery, e.g., ribs).

In some embodiments, the second set of anatomical elements may comprise anatomical elements that can be seen, located, or otherwise identified in all of the plurality of 2D images. For example, any anatomical feature or group of anatomical features that can be identified in some but not all of the plurality of 2D images (e.g., soft tissue that is identifiable in a 2D image captured when an imaging device is orthogonal to the back of the patient, but that is not identifiable in a 2D image captured when the imaging device is parallel to the back of the patient) may be excluded from the second set of anatomical elements. In these embodiments, the comparison algorithm may determine that an anatomical feature is in all of the plurality of 2D images by using simulated and/or historical data (e.g., data about the patient anatomy based on previous surgeries, simulated data of anatomical features, etc.) regarding the actual or expected appearance of the anatomical feature at each of the various angles and poses used to capture the plurality of 2D images, and matching the actual or expected appearance with an anatomical feature appearing in each of the plurality of 2D images.

In some embodiments, the segmenting may be based on at least an expected shape of anatomical elements. The expected shape may be a predetermined curve, structure, outline, curvature (and/or combinations thereof) uniquely associated with an anatomical element or capable of distinguishing the anatomical element from other anatomical elements. For example, the expected shape of a rib may be different from the expected shape of a vertebra. The segmentation algorithm may be trained (using real image data and/or artificial/simulated image data) on an expected shape of one or more anatomical elements depicted in the 2D image and may segment the 2D image based on such training. In at least one embodiment, the segmentation algorithm may segment at least one rib and at least one vertebra based on the expected shapes thereof.

Also in some embodiments, the segmenting of the second set of anatomical elements from the plurality of 2D images in the step 216 is based on the 3D image received in the step 204, and/or on the segmenting of the first set of anatomical elements in the step 208. For example, the segmenting may comprise orienting the 3D image to reflect a pose of the imaging device used to capture one of the plurality of 2D images, and then determining which anatomical elements are visible with the 3D image in that pose. Additional information useful for segmenting the second set of anatomical elements from the plurality of 2D images may also be obtained by analyzing the 3D image from a different perspective (e.g., to obtain information about anatomical element position, orientation, and/or spacing in a dimension that is not shown in the 2D images. Boundary information corresponding to each such anatomical element in the 3D image may likewise be used to determine how to properly segment the anatomical elements visible in the 2D image.

The method 200 also comprises cleaning the plurality of 2D images (step 220). The cleaning (e.g., removal of extraneous or noisy portions of the plurality of the 2D images) may occur after the segmentation of each of the plurality of 2D images. In this case, the cleaning may only occur in portions of each of the plurality of 2D images containing target anatomical features (e.g., segments containing at least one vertebra). The cleaning may comprise one or more steps, such as gradient matching, identifying image overlap, pixel subtraction, combinations thereof, and/or the like, as explained below in connection with the method 300.

In at least one embodiment, an image processing algorithm (e.g., an image processing algorithm 120) may identify (based on the segmentation of the 3D image and the plurality of 2D images) a target anatomical element, such as a vertebra, as well as an extraneous or incidental anatomical element, such as a rib. The image processing algorithm may additionally identify one or more portions of the image where the vertebra overlaps the rib (or vice versa). The image processing algorithm may then remove some or all of the image data associated with the rib from the image. In some embodiments, the image processing algorithm may detect or receive information corresponding to one or more gradients (e.g., changes in pixel values that may indicate a boundary between an anatomical element and a background and/or another anatomical element) in the segmented 2D image to identify the overlap. For example, the vertebra may overlap the rib (or vice versa), which may cause one or more gradients to appear in the surface area of the vertebra in the 2D image, which in turn may indicate that the vertebra overlaps another anatomical element (in this case, a rib). The image processing algorithm may identify a portion of the segmented vertebra in the 2D image containing pixels associated with the rib (including, for example, one or more of the areas of the image containing pixels associated with only the rib and one or more areas of the image containing pixels associated with both the rib and the vertebra due to overlap therebetween) and may remove the pixels and/or image data associated therewith (e.g., using pixel subtraction), leaving an image devoid of pixels representative of or corresponding to the rib. In some embodiments, the cleaning may additionally or alternatively comprise subtracting pixels associated with any and/or all incidental anatomical elements based on the appearance of one or more gradients in the surface areas of target anatomical elements.

In some embodiments, the image processing algorithm may additionally or alternatively use the 3D image to verify an overlap. For example, the image processing algorithm may analyze the pixel values associated with the 3D image from the same angle at which the 2D image was captured and may use data associated with a second different angle that provides missing depth information about the 2D image (e.g., the relative distances of the anatomical elements depicted in the 2D image in the third dimension) to determine the actual boundaries and/or gradients that should appear in the 2D image.

The method 200 also comprises registering between the 3D image and the plurality of 2D images based on the first set of segmented anatomical elements and the segmented second set of anatomical elements (step 224). The step 224 may make use of a processor (e.g., a processor 104) utilizing a registration algorithm, such as a registration algorithm 128. The registration algorithm may transform, map, or create a correlation between the 3D image and/or components thereof and each of the plurality of 2D images, which may then be used by a system (e.g., a system 100) and/or one or more components thereof (e.g., a navigation system 118) to translate one or more coordinates in the patient coordinate space to one or more coordinates in a coordinate space of a robot (e.g., a robot 114) and/or vice versa. As previously noted, the registration may comprise registering between a 3D image (e.g., a CT scan) and one or more 2D images (e.g., fluoroscopy images) and/or vice versa, and/or between a 2D image and another 2D image and/or vice versa.

The registration utilizes at least one of the segmented first set of anatomical elements and at least one of the segmented second set of anatomical elements. For example, where segmenting results in identification of the first set of anatomical elements and of the second set of anatomical elements, such that each anatomical element in the first and second sets is known to be a particular, unique anatomical element, such identification may be used to align a given anatomical element as depicted in the 3D image with the same anatomical element as depicted in one or more of the plurality of 2D images. As a more specific example, where the segmenting results in identification of the L3 vertebra (including the boundaries thereof) in the 3D image as well as in one or more of the plurality of 2D images, the registering may comprise aligning the L3 vertebra as depicted in the 3D image with the L3 vertebra as depicted in one or more of the plurality of 2D images. Such alignment may be sufficient to permit registration of the one or more of the plurality of 2D images to the 3D images, or one or more additional alignments may be made using one or more additional segmented anatomical elements, until the one or more of the plurality of 2D images are properly aligned with the 3D image and a registration between the images (e.g., a mapping of the images to each other such that, given a particular point in one image, a corresponding point in another image may be readily identified) may be determined, made, or otherwise accomplished.

In some embodiments, advanced registration techniques may be utilized in connection with the step 224. For example, where the 3D image depicts the patient in a first pose, and the plurality of 2D images depict the patient in a second pose, the registering may comprise modifying the 3D image by adjusting a position of one or more segmented anatomical elements therein, so that a pose of the segmented anatomical elements in the 3D image (e.g., of the first set of anatomical elements) corresponds to a pose of the segmented anatomical elements in the 2d image (e.g., of the second set of anatomical elements). In this manner, the 3D image may not only be registered to the one or more of the plurality of 2D images, but also be updated to reflect a current (e.g., intraoperative) pose of the patient.

In some embodiments, the registration may be based on one or more gradients. For example, the registration algorithm may align, match, and/or map one or more gradients from the 3D image to a corresponding one or more gradients in each of the 2D images. In some embodiments, the registration algorithm may determine a first set of identifiers or characteristics associated with the one or more gradients depicted in the 3D image (e.g., pixel values, changes in one or more pixel values in a variety of directions, average pixel value change in one or more directions in the image, etc.) and compare the identifiers or characteristics to a second set of identifiers or characteristics calculated based on each of the 2D images. Based on similarities or patterns between the two sets of identifiers or characteristics (e.g., same pixel value changes), the registration algorithm may determine that a gradient present in the 3D image corresponds to a gradient present in one or more of 2D images. The determined presence of the corresponding gradients in both images may allow a system (e.g., a system 100) and/or one or more components thereof (e.g., a navigation system 118) to transform or map the location of one or more anatomical features in the 3D image to respective one or more anatomical features in the one or more of the 2D images, or vice versa. Once completed, the registration is useful, for example, to facilitate a surgery or surgical task (e.g., controlling a robot and/or robotic arm with patient anatomy and/or providing image-based guidance to a surgeon).

In some embodiments, the 3D image does not comprise any fiducials, tracking markers, or other non-anatomical registration aids depicted therein. In these embodiments, the plurality of 2D images also do not comprise any fiducials, tracking markers, or other non-anatomical registration aids depicted therein. Instead, one or more of the segmented first set of anatomical elements and one or more of the segmented second set of anatomical elements are used to align the images for registration purposes.

In still further embodiments, the registration may be performed one or more times intraoperatively (e.g., during surgery) to update, adjust, and/or refresh the current registration. For example, a new 3D image and/or a new plurality of 2D images may be captured intraoperatively, and a new registration may be completed therefrom (e.g., using a preoperative 3D image and a new plurality of intraoperative 2D images, a new intraoperative 3D image and a new plurality of 2D images, or otherwise). An updated registration may be required, for example, if a pose of the patient changes or is changed during the course of a surgical procedure.

The present disclosure encompasses embodiments of the method 200 that comprise more or fewer steps than those described above, and/or one or more steps that are different than the steps described above.

Figure 3:
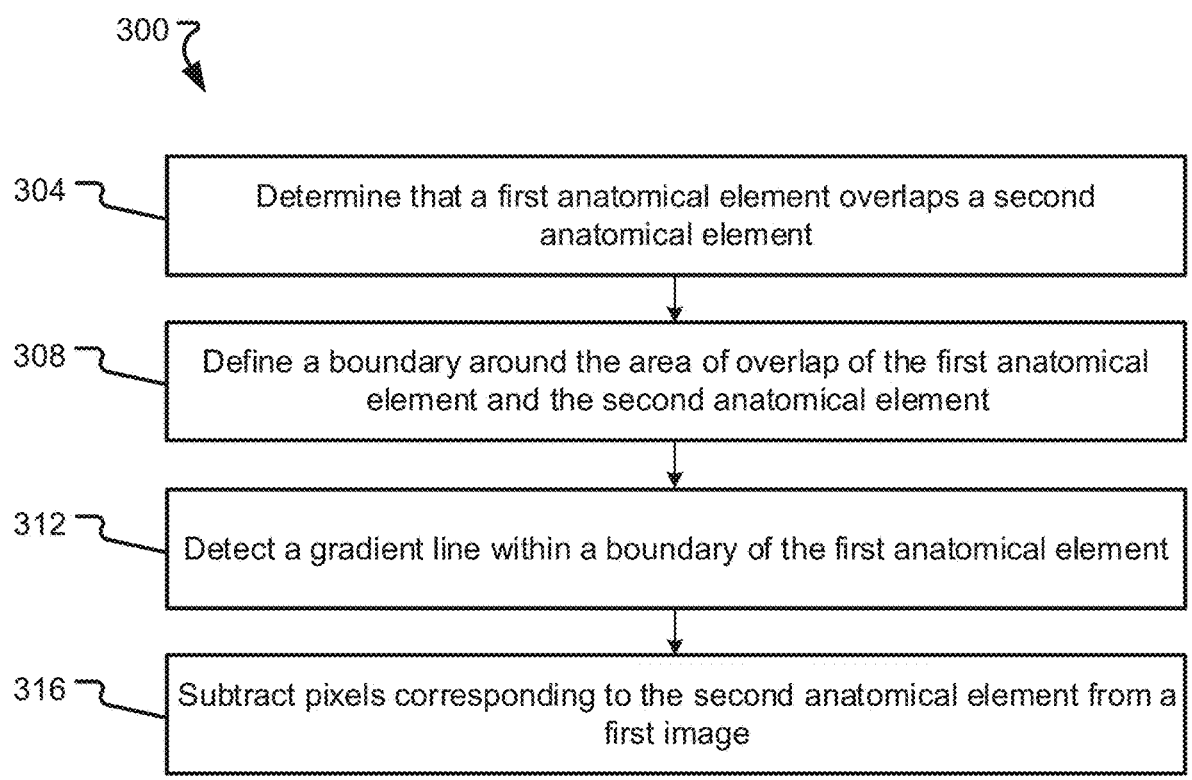
FIG. 3 is a flowchart according to at least one embodiment of the present disclosure.

FIG. 3 depicts a method 300, one or more aspects of which may be used, for example, to clean, filter, or otherwise improve image quality associated with one or more of a plurality of 2D images. Generally speaking, the method 300 describes aspects that may be included or utilized in connection with the step 220 of the method 200, discussed above. Notwithstanding the foregoing, the steps discussed below in the method 300 may additionally or alternatively be applied to a 3D image. In some embodiments, one or more of the steps of the method 300 may be used additionally or alternatively to the step 220.

The method 300 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 300. The at least one processor may perform the method 300 by executing instructions stored in a memory such as the memory 106. The instructions may correspond to one or more steps of the method 300 described below. The instructions may cause the processor to execute one or more algorithms, such as an image processing algorithm 120, a segmentation algorithm 122, a detection algorithm 124, and/or a registration algorithm 128.

The method 300 comprises determining that, as depicted in an image (e.g., one of the plurality of 2D images described above in connection with the method 200), a first anatomical element overlaps a second anatomical element (step 304). In some embodiments, the first anatomical element and the second anatomical element may be elements of a set of anatomical elements (e.g., a set of elements depicted in at least one of a plurality of 2D images such as a plurality of fluoroscopy images). The first and second anatomical elements, as well as the entire set of elements of which the first and second anatomical elements are a part, may have been segmented (e.g., as described above in connection with the step 216). The step 304 may use an image processing algorithm, such as an image processing algorithm 120, to identify an overlap between the first anatomical element and the second anatomical element. For example, the image processing algorithm may receive a 2D image (e.g., a single fluoroscopy image) depicting both the first anatomical element and the second anatomical element as a single, substantially continuous (e.g., having substantially similar pixel values) portion of the image, and determine (e.g., based on pixel values, historical data, simulated anatomy, an available 3D image of the anatomy in question, etc.) that the portion in question comprises an overlap between the first anatomical element and the second anatomical element. In some embodiments, the image processing algorithm may receive a segmented 2D image (e.g., a fluoroscopy image that has been segmented, for example, using a step 216), and may detect or otherwise locate an overlap in the segmented 2D image. In such embodiments, the segmenting may be the basis for or otherwise facilitate in reaching the determination that a portion of the image corresponds to a first anatomical element overlapping a second anatomical element or vice versa.

In some embodiments, the image processing algorithm may be or comprise one or more machine learning algorithms used to identify an overlap based on training data. For instance, the training data may be based on images (whether actual and/or artificial/simulated) of overlapping anatomical features, such as overlapping images of ribs and vertebrae. In at least one embodiment, the image processing algorithm may be configured to receive an image depicting both ribs and at least one vertebra and to detect an overlap between the ribs and the at least one vertebra. An anatomical atlas, information about a shape of vertebrae and/or ribs, and/or other information may be used to facilitate such detection. In embodiments where a segmented 2D image received by the image processing algorithm contains multiple anatomical elements, such as target anatomical elements (e.g., vertebrae or other anatomical structures on which a surgery or surgical procedure is planned to be or is being performed) as well as incidental anatomical elements (e.g., ribs or other anatomical structures on which a surgery or surgical procedure is not planned to be or being performed), the image processing algorithm may identify an overlap based on the relative pixel values and/or coordinates of each of the anatomical elements. For example, if the segmented 2D image shows a rib overlapping a vertebra (or vice versa), the image processing algorithm may identify that the rib is not isolated from the vertebra (e.g., based on average pixel values of the rib and/or the vertebra) and/or vice versa. The image processing algorithm may base this identification on, for example, the pixel values and/or the changes thereof along a boundary of the anatomical element (e.g., a typical vertebra may have a first pixel value change between the vertebral boundary and the surrounding image of soft tissue, which may be different from when the vertebral boundary overlaps with the rib); the pixel value or an average of pixel values over an area (e.g., an overlap of two anatomical elements may increase the pixel value average in the area containing the overlap); training data (e.g., historical and/or artificial/simulated data of pixel values associated with an overlap); combinations thereof; and/or the like. In some embodiments, the image processing algorithm may receive a segmented 2D image in which the second set of anatomical elements have been labeled, highlighted, outlined, or otherwise marked to denote each unique anatomical element and/or one or more characteristics thereof. For instance, the segmented 2D image may have a unique outline around the second set of anatomical elements and/or individual anatomical elements thereof (when viewed, for example, on a user interface), and the image processing algorithm may be configured to use these determined outlines of the anatomical features and, when the outlines intersect or cross, verify that the anatomical features overlap.

The method 300 also comprises defining a boundary around an area of overlap of the first anatomical element and the second anatomical element (step 308). The area of overlap may be or comprise one or more portions of an image (e.g., a segmented fluoroscopy image) where an anatomical element (e.g., a vertebra) depicted in the image overlaps with one or more other anatomical elements (e.g., one or more ribs). In some embodiments, the step 308 may utilize a segmentation algorithm, such as a segmentation algorithm 122, to segment the area of overlap. For example, the segmentation algorithm may receive a segmented fluoroscopy image that has been tagged (e.g., using metadata) as having an existing overlap (e.g., received from an image processing algorithm such as one discussed above in step 304) and may identify the overlapping portion(s) and estimate one or more boundaries therearound.

In at least one embodiment, the received image may be a segmented fluoroscopy image, with the area of overlap comprising a first anatomical element or tissue (e.g., a vertebra) overlapping one or more portions of a second anatomical element or tissue (e.g., a rib). In this embodiment, the segmentation algorithm may identify an area where the first anatomical element overlaps the second anatomical element and/or vice versa and create a boundary therearound (e.g., a highlight, pixel value change, a gradient, etc., such that a boundary is visible when the image is displayed on a user interface). In some embodiments, the boundary may be unique relative to other boundaries (such as boundaries used to segment sets of anatomical elements) rendered on the image. The unique boundary may be used, for example, by a system (e.g., a system 100) and/or one or more components thereof (e.g., a navigation system 118, a registration algorithm 128, etc.) during registration. In this example, the unique boundary may indicate to the system that any features within the boundary constitute an overlap of anatomical elements (e.g., a rib overlapping with a vertebra), and to omit the use of any features contained within the boundary during registration (e.g., a registration algorithm may omit using features such as gradient values within the boundary when registering to and/or from the image), to reduce the probability of an error in registration associated with incorrect coordinate mapping of overlapping features. Alternatively, the unique boundary may be used to identify an area of the image(s) comprising overlapping anatomical elements, so that the area in question may be cleaned in accordance with one or more steps of the method 300 so as to plainly show the proper boundaries (whether actual or estimated) of a target anatomical element therein.

The method 300 also comprises detecting a gradient line within a boundary of a first anatomical element depicted in a first image (step 312). The first anatomical element may be an anatomical element (e.g., a vertebra) from a set of anatomical elements (e.g., a set of anatomical elements identified from a plurality of 2D images such as a plurality of fluoroscopy images), and may additionally comprise a border (e.g., a highlight, outline, etc.) therearound. In some embodiments, the first anatomical element may overlap with one or more other anatomical elements, which may be labeled or otherwise marked in the image (e.g., with boundaries around the overlaps, with areas of overlap highlighted, etc., when the image is rendered to a user interface). The step 312 may use a detection algorithm, such as a detection algorithm 124, which may detect one or more gradient lines within the boundary of the first anatomical element. In some embodiments, the one or more gradient lines may exhibit or be changes in visual contrast, pixel value(s), combinations thereof, and/or the like, and may be used by the detection algorithm to identify a type of anatomical element associated with the one or more gradient lines. The detection algorithm may use characteristics associated with the one or more gradient lines to identify the anatomical element to which the one or more gradients belong (e.g., each anatomical element may have unique or characteristic gradient lines, which may in turn correspond to a boundary of the anatomical element). In some embodiments, the detection algorithm may detect and classify all gradient lines within the boundary (e.g., using a classifier such as a Support Vector Machine (SVM), a K Nearest Neighbors algorithm (KNN), or the like). In these embodiments, the detection algorithm may label any gradient lines associated with extraneous or incidental anatomical elements to the surgery or surgical procedure (e.g., ribs during a surgery on vertebrae). Additionally or alternatively, the step 316 may identify gradient lines associated with any areas of overlap between the first anatomical element and any other anatomical element.

The method 300 also comprises subtracting pixels corresponding to the second anatomical element from a first image (step 316). The first image is the image depicting the first and second anatomical elements, described above in connection with the step 304. In some embodiments, the first image may be a 2D image from a plurality of 2D images (e.g., fluoroscopy images), the first anatomical element may be a target anatomical element (e.g., a vertebra or other anatomical material on which a surgery or surgical task is planned to be or is being conducted), and the second anatomical element may be an incidental or extraneous anatomical object or tissue on which a surgery or surgical procedure is not planned to be or being performed (e.g., a rib). The method 300 may make use of an image processing algorithm, such as an image processing algorithm 120, to subtract pixels representative of, or to remove image data associated with, the second anatomical element. In some embodiments, the image processing algorithm may receive a previously processed image (e.g., an image in which an overlap of anatomical elements has been determined, an image in which gradient values of various anatomical elements do not match expected values or have multiple gradient values, etc.).

In one embodiment, the image processing algorithm may subtract the pixel values associated with the second anatomical element from the first image. For example, if the first anatomical element is a vertebra which overlaps with a rib (or vice versa), the image processing algorithm may isolate the pixels associated with the rib (e.g., based on a segmentation and/or the results of any aspect of the method 300 described above), and may subtract or otherwise remove them from the image and/or image data. In some embodiments, only certain portions of the first anatomical element may be subtracted or removed. For example, the image processing algorithm may remove a non-overlapping portion of the second anatomical element (e.g., a portion of the second anatomical element that does not overlap with any other anatomical element in the image) while keeping the portions of the second anatomical element that overlap other anatomical elements. In such embodiments, the pixels associated with the non-overlapping portions of the second anatomical element may be subtracted or zeroed out, which may remove the visibility of the non-overlapping portions of the second anatomical element (when viewed on a user interface).

In some embodiments, the image processing algorithm may use or calculate an average pixel value of the pixels associated with the second anatomical element (including, e.g., pixels from a non-overlapping portion(s) of the second anatomical element, pixels from the overlapping portion of the second anatomical element with the first anatomical element, and/or a combination thereof), and subtract the average pixel value from the pixels associated with the second anatomical element. In still other embodiments, the pixel values associated with the non-overlapping portion(s) of the second anatomical element may be zeroed out or set to a background pixel value (e.g., an average pixel value based on the average pixel value of the image excluding the values associated with segmented anatomical elements as determined by a segmentation and/or image processing algorithm), while the pixels associated with the overlapping portion(s) of the second anatomical element may have an average pixel value of the non-overlapping portion(s) of the second anatomical element subtracted therefrom (e.g., such that the pixel value of the overlapping portion becomes approximately the pixel value associated with a first anatomical element).

In some embodiments, the pixel subtraction may be based on one or more gradient lines. As previously mentioned, the one or more gradient lines may be identified and correlated to an anatomical element or group of anatomical elements (as discussed in the step 220). The image processing algorithm may receive the image, including identified or marked anatomical elements based on the one or more gradient lines, and may remove pixels of incidental or extraneous anatomical elements based on the gradient lines. For example, the image processing algorithm may receive an image in which gradient lines linked to a rib (which may be extraneous to a surgery performed on a vertebra) may be present. The image processing algorithm may then remove one or more pixels associated with the rib (e.g., portions or the entirety of the rib) based on an outline or boundary of the rib.

In some embodiments, the pixel subtraction may be based on an expected shape of one or more anatomical elements present in the image. As previously discussed, the expected shape may be a predetermined curve, structure, outline, curvature, and/or the like associated with an anatomical element which may distinguish or uniquely identify the anatomical element. The expected shape may be based on a 3D image of the anatomical element in question, data available in one or more other 2D images of the anatomical element in question, an anatomical atlas, a 3D model of the anatomical element in question, or any other information about the anatomical element at issue. In some embodiments, the image processing algorithm may receive the image, including information related to the expected shape of each of the anatomical elements present in the image. The image processing algorithm may then remove pixels associated with extraneous or incidental anatomical elements based on the expected shape of the anatomical elements. For example, a first anatomical element may be identified as a rib, and a second anatomical element may be identified as a vertebra. The image processing algorithm may then remove, modify, or subtract some or all of the pixel values associated with extraneous anatomical elements (in this case, the rib).

The present disclosure encompasses embodiments of the method 300 that comprise more or fewer steps than those described above, and/or one or more steps that are different than the steps described above.

As noted above, the present disclosure encompasses methods with fewer than all of the steps identified in FIGS. 2 and 3 (and the corresponding description of the methods 200 and 300), as well as methods that include additional steps beyond those identified in FIGS. 2 and 3 (and the corresponding description of the methods 200 and 300). The present disclosure also encompasses methods that comprise one or more steps from one method described herein, and one or more steps from another method described herein. Any correlation described herein may be or comprise a registration or any other correlation.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   receiving a computed tomography (CT) image of a patient;
   segmenting a first set of anatomical elements from the CT image;
   receiving a plurality of fluoroscopy images of the patient;
   segmenting a second set of anatomical elements from the plurality of fluoroscopy images, the segmenting comprising determining that a first anatomical element overlaps a second anatomical element by at least detecting a gradient line within a boundary of the second anatomical element in at least one of the plurality of fluoroscopy images; and
   creating a registration between the CT image and the plurality of fluoroscopy images based on the segmented first set of anatomical elements and the segmented second set of anatomical elements.

2. The method of claim 1, wherein the first anatomical element is a vertebra and the second anatomical element is a rib.

3. The method of claim 1, further comprising subtracting pixels corresponding to the first anatomical element from at least one of the plurality of fluoroscopy images.

4. The method of claim 3, wherein the subtracting is based on information about an expected shape of at least one of the first anatomical element and the second anatomical element.

5. The method of claim 1, wherein creating the registration comprises matching at least one first gradient corresponding to at least one anatomical element of the first set of anatomical elements with at least one second gradient corresponding to at least one anatomical element of the second set of anatomical elements.

6. The method of claim 1, further comprising removing one or more gradient lines from at least one of the plurality of fluoroscopy images.

7. The method of claim 1, wherein the first set of anatomical elements comprises at least one of a patella and a soft tissue anatomical element.

8. A system, comprising:
   a processor; and
   a memory storing instructions that, when executed by the processor, cause the processor to:
   receive a three-dimensional (3D) image of a patient's anatomy;

segment a first set of anatomical elements from the 3D image;

cause an imaging device to capture one or more two-dimensional (2D) images of the patient's anatomy;

segment a second set of anatomical elements from the one or more 2D images, the segmenting of the second set of anatomical elements comprising defining a boundary of at least one anatomical tissue, wherein the boundary defines an area indicating an overlap between the at least one anatomical tissue and an anatomical object of the segmented second set of anatomical elements;

clean the one or more 2D images by removing at least one gradient line from each 2D image of the one or more 2D images; and register the one or more cleaned 2D images to the 3D image based on the segmented first set of anatomical elements and the segmented second set of anatomical elements.

9. The system of claim 8, wherein the at least one anatomical tissue comprises a patella or a soft tissue anatomical elements.

10. The system of claim 8, wherein the segmenting of the second set of anatomical elements is based on information about an expected shape of at least one of the at least one anatomical tissue and the anatomical object.

11. The system of claim 8, wherein the at least one gradient line is located in the anatomical object of the segmented second set of anatomical elements.

12. The system of claim 8, further comprising subtracting pixels corresponding to the at least one anatomical tissue from the segmented second set of anatomical elements.

13. The system of claim 8, wherein the segmenting of the second set of anatomical elements further comprises identifying one or more gradient lines associated with each of the first set of anatomical elements.

14. The system of claim 8, wherein the 3D image and the one or more 2D images omit using fiducials.

15. A system, comprising:
a processor;
an imaging device; and
a memory storing instructions thereon that, when executed by the processor, cause the processor to:

receive a three-dimensional (3D) image;

cause the imaging device to capture one or more two-dimensional (2D) images;

segment a first set of anatomical elements from the 3D image;

segment a second set of anatomical elements from each of the one or more 2D images, the segmenting including defining a boundary of a first anatomical object, wherein the boundary defines an area indicating an overlap between the first anatomical object and a second anatomical object of the segmented second set of anatomical elements;

remove the first anatomical object from at least one of the one or more 2D images to yield one or more cleaned 2D images; and register the one or more cleaned 2D images to the 3D image based on the segmented first set of anatomical elements and the segmented second set of anatomical elements.

16. The system of claim 15, wherein the removing the first anatomical object further comprises subtracting pixels corresponding to the first anatomical object from the at least one of the one or more 2D images.

17. The system of claim 16, wherein the subtracting is based on information about an expected shape of at least one of the first anatomical object and the second anatomical object.

18. The system of claim 15, wherein the 3D image is a CT scan, an MRI scan, or an ultrasound.

19. The system of claim 15, wherein the one or more 2D images is a fluoroscopy image, an MRI image, or an ultrasound image.

20. The system of claim 15, wherein the first anatomical element comprises a rib.

21. The system of claim 15, wherein the 3D image and the one or more 2D images omit using fiducials.

22. The system of claim 15, wherein the registering comprises matching at least one first gradient corresponding to at least one anatomical element of the first set of anatomical elements with at least one second gradient corresponding to at least one anatomical element of the second set of anatomical elements.

* * * * *